Sept. 20, 1955　　　H. RUHLMANN　　　2,718,194
VEHICLE GUIDING DEVICE
Filed April 24, 1951
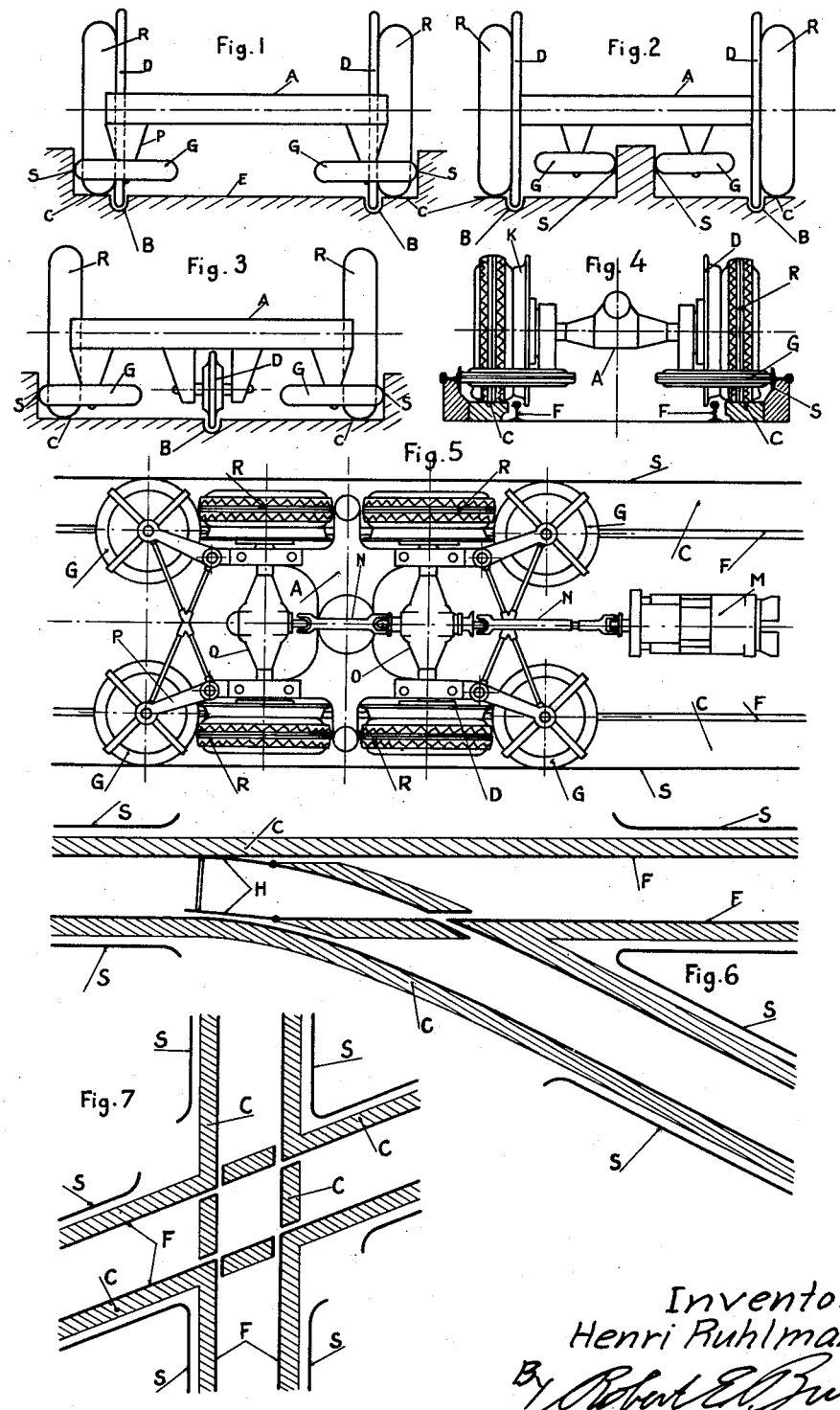
Inventor
Henri Ruhlmann
By Robert E. Burns
Attorney

United States Patent Office 2,718,194
Patented Sept. 20, 1955

2,718,194

VEHICLE GUIDING DEVICE

Henri Ruhlmann, Montmorency, France

Application April 24, 1951, Serial No. 222,546

Claims priority, application France May 11, 1950

6 Claims. (Cl. 104—247)

The present invention relates to vehicle guiding devices and particularly to a system for guiding a vehicle running on a track.

To reduce vibration and noise, it has previously been proposed to replace the conventional steel wheels of rail vehicles with wheels having rubber tires. Such wheels preferably run on flat tracks or runways which are spaced apart a distance corresponding to the spacing of the wheels. In order to keep the wheels on the runways, it has been proposed to provide the vehicle with pairs of rollers rotatable about vertical axes and engaging opposed vertical guiding surfaces that are provided parallel to the runway. While this system is satisfactory for continuous single-track lines having no switches or cross-overs, it cannot satisfactorily be used where switches and cross-overs are required since the vertical guiding surfaces must be interrupted at a switch or cross-over, thus leaving the vehicle without guiding means at a critical point in the track.

It has also been proposed to guide such vehicles by means of one or more discs rotatable about axes parallel to the axes of the running wheels of the vehicle and engaging grooves provided in the roadbed parallel to the tracks for the running wheels. The side surfaces of the peripheries of the discs engage the edges of the groove to keep the running wheels on the track. Since the engagement of the discs with the edges of the grooves is a sliding, rather than rolling, engagement and since the areas of contact are necessarily rather limited, the edges of the grooves and the discs must be made of hard, strong material such as metal. With this system, the edges of the grooves and the discs are subjected to a considerable amount of wear and tear and produce a great deal of noise, especially at high speed. Hence, the advantages of using rubber tired running wheels are largely lost.

It is an object of the present invention to provide an improved system of guiding a vehicle to keep it on a track that avoids the objections to both of the above mentioned systems. In accordance with the invention, the advantages of the two systems are combined while eliminating their disadvantages.

The nature and advantages of the invention will be fully understood from the following description of preferred embodiments of the invention shown by way of example in the accompanying drawings in which:

Figs. 1, 2, 3 and 4 are schematic cross-sectional views showing vehicle running gear and guiding means on various kinds of tracks.

Fig. 5 is a partial schematic plan view of the running gear and track shown in Fig. 4.

Fig. 6 is a schematic plan of a section of track including a switch.

Fig. 7 is a schematic plan of a section of track including a cross-over.

As illustrated in the drawings, the track comprises spaced parallel runways C on which the load-carrying wheels of the vehicle are adapted to run. The runways C are shown as flat horizontal strips or surfaces. The track is provided with vehicle-guiding edges which are parallel to the runways C and extend downwardly from the level of the runways. In the tracks shown in Figs. 1, 2 and 3, the guiding edges are provided by the side edges of grooves B formed in the roadbed. Figs. 1 and 2 show two such grooves, one just inside of each of the runways C. In Fig. 3, there is a single groove B midway between the two runways. While four guiding edges are shown in Figs. 1 and 2—each of the grooves B having two side edges—it is not necessary to provide more than two guiding edges for the track. Thus, for example, in Fig. 1, the central section E may be omitted so as to provide in effect a wide groove or recess between the two runways. However, as will appear from the explanation given below, the central section E must be filled sufficiently at switches and cross-overs in the track to provide substantially continuous runways for the load-bearing wheels.

In Figs. 4 to 7, the guiding edges are provided by rails F which may be ordinary railroad rails and are located just inside the runways C, being parallel to the runways. The term "parallel" is herein used in a broad, rather than a technical, sense, to mean equidistant from the runways when the latter are curved.

The track is also provided with opposed guiding surfaces S which are parallel to the runways C and extend upwardly from the level of the runways. In the forms shown in Figs. 1, 3 and 4, the guiding surfaces S are formed by upwardly projecting shoulders or curbs located outside the runways C. In Fig. 2, the guiding surfaces S are provided by the opposite sides of a single curb or strip located midway between the runways.

It will be understood that the forms of track shown in the drawings are merely by way of example and that the invention is in no way limited to these specific forms. The guiding edges that project downwardly from the level of the runways C may be disposed either inside or outside of said runways and may be formed by one or more grooves or recesses or other configurations providing suitable guiding edges. Likewise, the upwardly projecting guiding surfaces S may be either inside or outside the runways C. While the guiding surfaces S are herein referred to as being vertical, they need not be exactly vertical but may be somewhat inclined, although they should project upwardly in a generally vertical direction.

The running gear comprises trucks A, for example one at each end of the vehicle. Each of the trucks A has one or more pairs of load-carrying or running wheels rotatable about horizontal axes disposed perpendicularly to the direction of movement of the vehicle. The wheels R are preferably provided with rubber tires, the term "rubber" being used to include natural rubber as well as synthetic rubber and other materials having similar physical characteristics. Pneumatic tires are preferred although solid tires or tires filled with a cushion material, such as sponge rubber, may, if desired, be used. The load-carrying wheels R may be free-running and may be either on a common axle or separate axle. Alternatively, at least some of the wheels R may be driven, for example by a motor M (Fig. 5) which drives the wheels through drive shafts N and differentials O. The running gear may, if desired, be provided with springs, although, with a smooth roadbed, the pneumatic tires on the wheels R provide sufficient cushioning so that no springs are necessary.

The vehicle is guided to keep the wheels R on the runways C by guiding means comprising discs D and rollers G.

The discs D are rotatable about horizontal axes parallel to the axes of the load-carrying wheels R and are adapted to engage the guiding edges formed by the side edges of the grooves B (Figs. 1 to 3) or the rail F (Figs.

4 to 7). The term "parallel" is here used to include a relationship in which the discs D and the load-carrying wheels R are coaxial as well as a construction in which the axes of the discs and the wheels are parallel but spaced from one another. Where the discs D are coaxial with the wheels R (Figs. 1, 2 and 4), they are of somewhat greater diameter than the wheels so that the rims of the discs project down below the level of the runways C so as to engage the guiding edges provided by the grooves B or rails F. Alternatively, the axes of the discs may be either lower or higher than that of the wheels, the diameter of the discs in each case being such as to cause the periphery of the disc to project downwardly below the runways C. For example, in Fig. 3, the axis of the disc D is lower than the axis of the wheels R, thereby permitting the use of a smaller disc. The discs D may be either outside the wheels R or inside the wheels, as shown in Figs. 1, 2 and 4, the latter construction being preferred. While two discs have been shown in these figures for each pair of wheels, a single disc at one side only of the running gear will suffice. Alternatively, the discs D may be mounted approximately midway between the wheels, as illustrated in Fig. 3. Where the discs D are mounted adjacent the wheels R, they are preferably apertured to afford better cooling of the tires and also any brakes that may be associated with the wheels. While the members D are, for convenience, referred to as "discs," it will be understood that it is the peripheral rim only of the disc that is active in engaging the guiding edges of the track and hence the member may be of any suitable form, providing it has a suitable rim. In the form shown in Figs. 4 and 5, the discs D are provided with annular shoulders K adapted to engage the tops of rails F to support the vehicle in the event the tires of the running wheels R should become deflated.

The rollers G are rotated about approximately vertical axes and are adapted to engage the vertical guiding surfaces S of the track. They are preferably provided with pneumatic or other rubber tires so as to roll on the surfaces S without objectionable notice or vibration. Suitable mountings P are provided for rotatably supporting the rollers G. As with the load-carrying wheels R and discs D, anti-friction bearings are preferably used. In Figs. 1 and 3, the rollers G are shown in front of the wheels R. With the construction shown in Fig. 2, the axes of the rollers G may be in the same vertical plane as the axis of the wheels R or, alternatively, may be forwardly or rearwardly of the latter axis. In the embodiment shown in Figs. 4 and 5, rollers G are provided both in front and behind the truck comprising two pairs of running wheels R.

By engagement with the guiding surfaces S, the rollers G keep the running wheels R on the tracks C and also normally prevent engagement of the discs D with the guiding edges comprising the rails F or the side edges of the grooves B. The normal position is illustrated in Figs. 1 to 4. It will be seen that, in these figures, the discs D are free of engagement with the guiding edges of the track.

At a switching point, as shown in Fig. 6, the guiding surfaces S are interrupted so as not to interfere with the running wheels R of the vehicle and the rails F are provided with a conventional rail switch H. At a cross-over point (Fig. 7), the guiding surfaces S are also interrupted so as to provide unobstructed crossing of the runways C. At these points of interruption of the guiding surfaces S, the rollers G are, of course, ineffective to guide the wheels R and the guiding of the wheels is hence momentarily taken over by engagement of the discs D with the guiding edges provided by the grooves B or rails F. Since these guiding edges do not project above the runways C, they do not interfere with the wheels R. The narrow depressions in which the discs D run are of no consequence since the wheels R run over them without objectionable jolting or noise.

To provide an additional factor of safety, the guiding edges for the discs D are preferably continuous along the track. However, it will be understood that, since the guiding function is normally performed solely by the rollers G except where the guiding surfaces S are interrupted, for example at switches and cross-overs, the guiding edges for the discs D may, if desired, be omitted between the points where the surfaces S are interrupted.

It will be understood that the embodiments illustrated in the drawings are merely by way of example and that the invention is in no way limited to the specific embodiments herein shown and described. The various features of the several embodiments may be interchanged with one another and other structural modifications may be made, as desired, within the scope of the appended claims.

What I claim and desire to secure by Letters Patent is:

1. In a vehicle adapted to run on a track having spaced parallel runways, spaced opposed guiding edges parallel to the length of said runways and extending downwardly from the level of said runways and opposed guiding surfaces parallel to the length of said runways and extending upwardly from the level of said runways, said guiding surfaces being interrupted, running gear comprising spaced load-carrying wheels rotatable about horizontal axes and having rubber tires adapted to run on said runways, guiding discs rotatable about horizontal axes parallel to the axes of said wheels and having peripheral portions projecting below the level of said runways in position to engage said guiding edges but normally spaced laterally therefrom, and opposed rollers rotatable about vertical axes and adapted to roll on said guiding surfaces to steer said wheels, said discs being normally held out of engagement with said guiding edges by said rollers and engaging said edges laterally to keep said wheels on said runways only where said guiding surfaces are interrupted.

2. In a vehicle adapted to run on a track having switches and cross-overs, said track comprising approximately horizontal spaced parallel runways, opposed guiding edges parallel to the length of said runways and extending downwardly from the level of said runways and opposed guiding surfaces parallel to the length of said runways and extending upwardly from the level of said runways, said guiding surfaces being interrupted at switches and cross-overs of the track, running gear comprising spaced load-carrying wheels rotatable about horizontal axes and having rubber tires adapted to run on said runways, guiding discs rotatable about horizontal axes parallel to the axes of said wheels and having peripheral portions projecting below the level of said runways in position to engage said guiding edges but normally spaced laterally therefrom, and opposed rubber tired rollers rotatable about vertical axes and adapted to roll on said guiding surfaces to steer said wheels and normally hold said discs out of engagement with said guiding edges, said guiding discs engaging said guiding edges laterally to keep the wheels on said runways only where said guiding surfaces are interrupted.

3. In a railway system, a track having switches and crossovers, said track comprising spaced parallel runways, opposed guiding edges parallel to the length of said runways and extending downwardly from the level of said runways and opposed guiding surfaces parallel to the length of said runways and extending upwardly above the level of said runways, said guiding surfaces being interrupted at switches and crossovers of the track, and running stock adapted to run on said track and having running gear comprising spaced load-carrying wheels rotatable about horizontal axes and having rubber tires adapted to run on said runways, guiding discs rotatable about horizontal axes parallel to the axes of said wheels and having peripheral portions projecting below the level of said runways in position to engage said guiding edges but normally spaced laterally therefrom, and opposed rubber tired rollers rotatable about vertical axes and adapted to roll on said guiding surfaces to steer said wheels and to hold said discs out of engagement with said guiding edges, said guiding discs laterally engaging said guiding edges only where said guiding surfaces are interrupted to keep the wheels on said runways.

4. In a railway system, a track having switches and crossovers, said track comprising spaced parallel runways which are approximately horizontal and constitute parallel strips of roadway suitable for pneumatic tired vehicles, opposed guiding rails running along the inner edges of said runways, the tops of said guiding rails being at substantially the level of said runways, said rails providing inner guiding edges extending downwardly from said level, and opposed guiding surfaces running along the outer edges of said runways and extending vertically upwards from the level of said runways, said guiding surfaces being interrupted at switches and crossovers of the track, and running stock adapted to run on said track and having running gear comprising spaced load-carrying wheels rotatable about horizontal axes and having pneumatic tires adapted to run on said runways, flanged wheels rotatable about horizontal axes parallel to the axes of said load-carrying wheels and having rims which are adapted to run on said rails but are normally held up out of engagement with said rails by the engagement of said tires—when properly inflated—with said runways and flanges which project down alongside said guiding edges and extend below the level of said runways even when said tires are properly inflated, and opposed rubber tired rollers rotatable about vertical axes and adapted to roll on said guiding surfaces to steer said wheels and to hold said flanges normally out of engagement with said guiding edges, said flanges laterally engaging said guiding edges only where said guiding surfaces are interrupted to keep the wheels on said runways.

5. In a railway system, a track having switches and crossovers, said track comprising spaced parallel runways which are approximately horizontal and constitute parallel strips of roadway suitable for pneumatic tired vehicles, rails running along the inner edges of said runways, the tops of said rails being at substantially the level of said runways, and opposed guiding surfaces running along the outside of said runways and extending upwardly above the level of said runways, said guiding surfaces being interrupted at switches and crossovers of the track, and running stock adapted to run on said track and having running gear comprising a frame, spaced load-carrying wheels rotatable on said frame about horizontal axes and having pneumatic tires adapted to run on said runways, flanged metal wheels disposed inside said pneumatic tired wheels and rotatable on the same axes, said flanged wheels being of smaller diameter than said pneumatic tired wheels when the tires are properly inflated so that said flanged wheels are normally held up out of engagement with said rails, flanges on said flanged wheels projecting down alongside said rails and extending below the level of said runway and rails even when said tires are properly inflated, opposed rubber tired rollers rotatable about vertical axes and adapted to roll on said guiding surfaces, and linkage connecting said rollers with said frame to steer said wheels and thereby keep said flanges normally out of engagement with said rails, said flanges laterally engaging said rails only where said guiding surfaces are interrupted to keep the pneumatic-tired wheels on said runways.

6. In a railway system, a track comprising two spaced parallel rails provided at selected points with switches and crossovers, parallel runways outside said rails, said runways being at substantially the level of said rails and comprising strips of roadway suitable for pneumatic tired vehicles, and opposed vertical guiding surfaces running along the outside of said runways and extending upwardly above the level of said runways, said guiding surfaces being interrupted at switches and crossovers of said rails, and running stock adapted to run on said track and having running gear comprising a frame, spaced transverse axles on said frame, load-carrying wheels on said axles and rotatable about horizontal axes, said wheels having pneumatic tires being suitably spaced to run on said runways, flanged metal wheels mounted on axles inside said pneumatic-tired wheels and rotatable on the same axes, said flanged wheels being spaced laterally so as to be above said rails and being of smaller diameter than said pneumatic-tired wheels when the tires are properly inflated so that said flanged wheels are normally held up out of engagement with said rails, flanges on said flanged wheels projecting down alongside said rails even when said tires are properly inflated, opposed rubber tired rollers rotatable about vertical axes and positioned to roll on said guiding surfaces, and linkage connecting said rollers with said frame to steer said wheels and thereby keep said flanges normally out of contact with said rails, said flanges laterally engaging said rails only where said guiding surfaces are interrupted to keep the pneumatic-tired wheels on said runways, said flanged wheels vertically engaging said rails to support the vehicle in the event of deflation of said tires.

References Cited in the file of this patent

UNITED STATES PATENTS

| | | |
|---|---|---|
| 8,867 | Valentine | Apr. 6, 1852 |
| 35,244 | Nair | May 13, 1862 |
| 310,597 | Leavitt et al. | Jan. 13, 1885 |
| 677,016 | Capewell | June 25, 1901 |
| 1,602,066 | Burton | Oct. 5, 1926 |
| 1,881,045 | Chapin et al. | Oct. 4, 1932 |
| 2,076,914 | Newton | Apr. 13, 1937 |
| 2,115,466 | Newton | Apr. 26, 1938 |